US006838175B2

(12) United States Patent
Katoh et al.

(10) Patent No.: US 6,838,175 B2
(45) Date of Patent: Jan. 4, 2005

(54) CARBON MICROROD AND METHOD OF PRODUCING THE SAME

(75) Inventors: Kaoru Katoh, Tsukuba (JP); Masahiro Yamada, Tsukuba (JP); Hiroko Kaneko, Tsukuba (JP); Yoshihisa Suda, Fujioka (JP)

(73) Assignees: National Institute of Advanced Industrial Science and Technology, Tokyo (JP); Tsukuba Materials Information Laboratory, Ltd., Ibaraki (JP); Mitsubishi Pencil Co., Ltd., Tokyo (JP)

( * ) Notice: Subject to any disclaimer, the term of this patent is extended or adjusted under 35 U.S.C. 154(b) by 0 days.

(21) Appl. No.: 10/058,301

(22) Filed: Jan. 30, 2002

(65) Prior Publication Data

US 2002/0102202 A1 Aug. 1, 2002

(30) Foreign Application Priority Data

Jan. 31, 2001 (JP) ........................................ 2001-024567

(51) Int. Cl.[7] ................................................ B32B 9/00
(52) U.S. Cl. ...................... 428/408; 428/401; 264/29.1; 264/29.5; 264/29.6
(58) Field of Search ................................ 428/408, 401; 264/29.1, 29.5, 29.6

(56) References Cited

U.S. PATENT DOCUMENTS 5,218,757 A   6/1993   Kaneko et al.

FOREIGN PATENT DOCUMENTS

| JP | 03188367 A | 8/1991 |
|----|------------|--------|
| JP | 2574495 B2 | 10/1996 |

OTHER PUBLICATIONS

Guennec et al., "A New Method of Attachment of Isolated Mammalian Ventricular Myocytes for Tension Recording: Length Dependence of Passive and Active Tension", *J. Mo. Cell Cardiol.*, 1990, vol. 22, pp. 1083–1093, Academic Press Limited.

Garnier, "Attachment Procedures for Mechanical manipulation of Isolated Cardiac Myocytes: A Challenge", *Cardiovascular Research*, 1994, vol. 28, pp. 1958–1964.

Yasuda et al., "A Novel Method to Study Contraction Characteristics of a Single Cardiac Myocyte Using Carbon Fibers", *Am. J. Physiol Heart Circ. Physiol*, 2001, vol. 281, pp. H1442–H1446.

*Primary Examiner*—Deborah Jones
*Assistant Examiner*—Abraham Bahta
(74) *Attorney, Agent, or Firm*—Foley & Lardner LLP

(57) ABSTRACT

A carbon microrod that holds a fine object by chemically adsorbing the object on the surface to make a dynamic measurement possible. An organic substance that leaves, after firing, glassy carbon that hardly becomes graphite, such as a chlorinated vinyl chloride resin, is mixed with a fine graphite powder having an average particle size of 1 μm, and the mixture is extrusion molded with a die having a diameter of 50 μm; the molded article is fired to give a carbon microrod comprising glassy carbon and crystalline carbon.

6 Claims, 1 Drawing Sheet

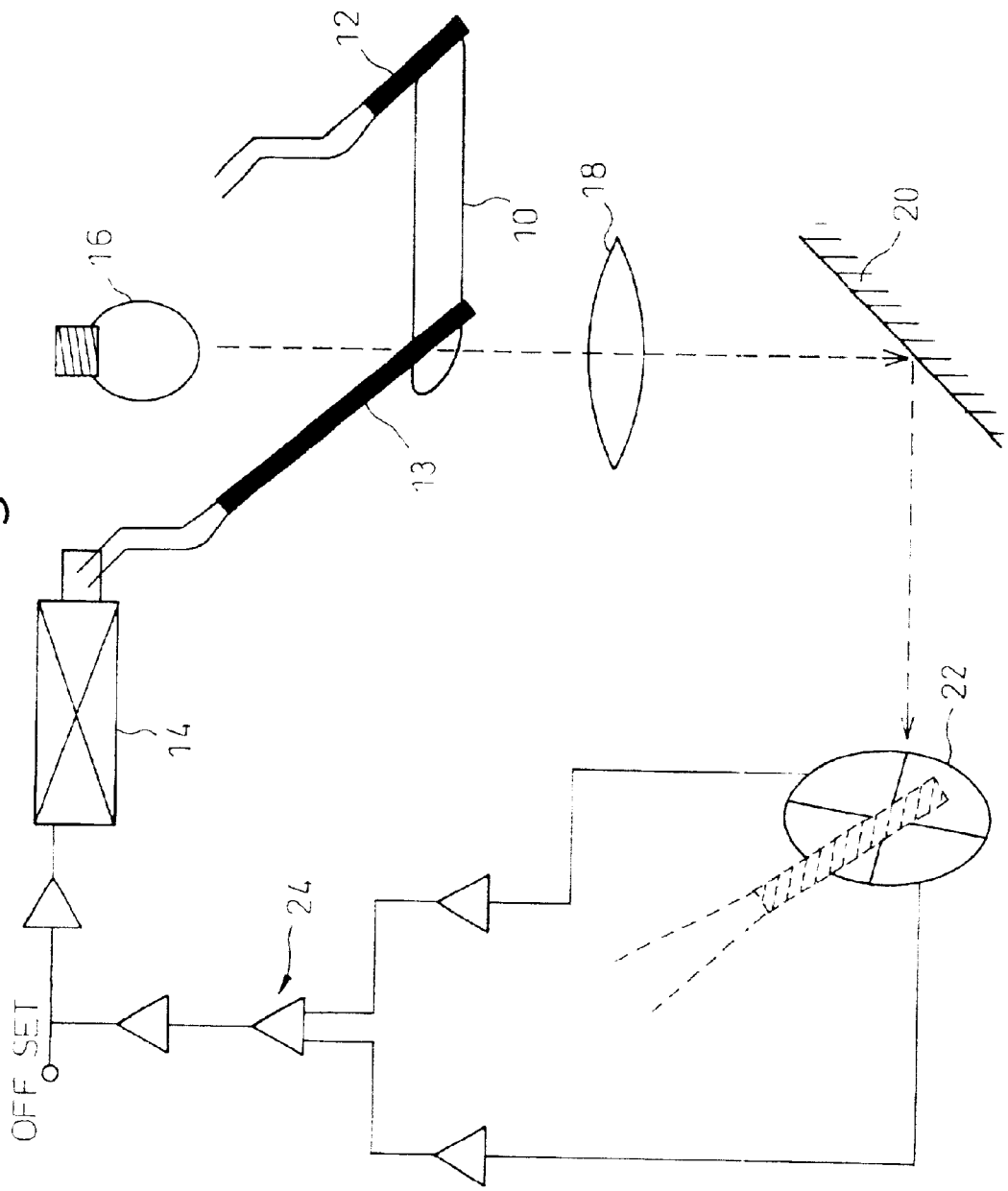

CARBON MICROROD AND METHOD OF PRODUCING THE SAME

BACKGROUND OF THE INVENTION

1. Field of the Invention

The present invention relates to a carbon microrod used for holding a fine object by adsorbing the object to the surface thereof.

2. Description of the Related Art

Measurements of the contraction force of a single myocyte having a length of a few centimeters are widely made in the fields of medical science, pharmacy and veterinary science and in industries such as the medicinal industry and the pharmaceutical industry.

However, measurements of the contraction force of a single myocardial cell is not put into a practical use because the size is small (about 100 $\mu$m) and because there is no method of fixing the cell to a sensor.

In order to hold a small object such as a myocardial cell and make dynamic measurements possible, it is necessary that the holder be as small as the object and that the holding force be enough to make the dynamic measurements possible. Moreover, when the object to be measured is a living cell, the holder is required to be nontoxic to not influence the function of the cell.

It can be taken into consideration that a carbon fiber, obtained by firing a resin, can be used as a holder that is nontoxic to a cell and that is very small. However, the use of a carbon fiber has the problem that dynamic measurements in a wide range cannot be made because the adsorption force at the surface of the carbon fiber, composed of glassy carbon is not sufficient.

SUMMARY OF THE INVENTION

Accordingly, an object of the present invention is to provide a carbon microrod that can hold a fine object to be measured and makes dynamic measurement, over a wide range, possible.

The carbon microrod of the present invention comprises a glassy carbon and a crystalline carbon.

The crystalline carbon is desirably oriented substantially in one direction.

In order for the carbon microrod to have a sufficient holding force, it is desirable that the carbon microrod contain at least in the surface portion at least 20% by mass of crystalline carbon, preferably at least 60% by mass thereof.

In order for the carbon microrod to be applicable to a fine object, it is also desirable that the carbon microrod have a cross-sectional diameter of up to 100 $\mu$m.

A method of producing a carbon microrod of the present invention comprises the steps of: mixing an organic substance that leaves glassy carbon after firing with graphite powder; molding the mixture so that the molded article has a desired shape; and firing the molded article.

Extrusion molding is desirably conducted in the molding step so that the crystals of the graphite are oriented substantially in one direction.

There are many functional groups, derived from carbon atoms on the edge faces and/or in the deficient portions of the bottom faces of crystals, present in the carbon microrod of the present invention. As a result, a sufficient adhesive force produced by chemisorption (chemical adsorption) by the functional groups can be obtained. When extrusion molding is conducted to orient the graphite crystals substantially in one direction, the proportion is increased to give a stronger adhesive force.

BRIEF DESCRIPTION OF THE DRAWINGS

FIG. 1 shows a view of an apparatus for measuring the contraction force of a myocardial cell as one example of a measurement in which the carbon microrods of the invention are used.

DESCRIPTION OF THE PREFERRED EMBODIMENTS

The organic substance that leaves glassy carbon after firing designates an organic resin material having a three-dimensional cross-linked structure, a natural organic material to be carbonized, and the like. The organic substance specifically designates a substance selected from an organic polymer substance, its monomer or its oligomer, a tar or a pitch, a dry distilled pitch, a thermoplastic resin, a primary polymer of thermosetting resin, and the like, or a mixture of at least two of these substances.

The organic polymer substance herein designates a substance that is other than thermoplastic resin and thermosetting resin to be explained later, and that is a compound having a condensed polycyclic aromatic group in the basic structure of the molecule such as lignin, cellulose, tragacanth gum, gum arabic, natural gum and its derivative, a saccharide, chitin and chitosamine, a formalin condensation product of napthalenesulfonic acid, an indanthrene-based vat dye derived from dinitronaphthalene, pyrene, pyranthrone, violanthrone, benzanthrone, or the like, and an intermediate of a vat dye.

Examples of the thermoplastic resin include conventional thermoplastic resins such as poly(vinyl chloride), polyacrylonitrile, poly(vinyldene chloride), post-chlorinated poly(vinyl chloride), poly(vinyl acetate), poly(vinyl alcohol), poly(vinyl pyrrolidone), ethyl cellulose, carboxymethyl cellulose, and vinyl chloride-vinyl acetate copolymer, and heat-resistant thermoplastic resins such as poly(phenylene oxide), poly(p-xylene), polysulfone, polyimide, polyamidoimide, polybenzimidazole and polyoxadiazole. Such a thermoplastic resin is subjected to oxidation cross-linking as carbon precursor formation treatment.

Examples of the thermosetting resin include phenol resin, furan resin, epoxy resin, xylene resin and copna resin. When the thermosetting resin is heated, it is made to flow, is subjected to intermolecular crosslinking to form a three-dimensional structure and is thermoset. When the thermosetting resin is fired, it is carbonized with a high carbon residue yield without a specific carbon precursor treatment.

In order to increase the adhesive force of graphite powder, it is important to prepare a composite carbon material in which the graphite structure is oriented so that the edge faces of the highly developed graphite crystals are arranged perpendicularly to the surface. Accordingly, graphite whisker, highly oriented pyrolitic graphite (HOPG), kish graphite and crystalline natural graphite are preferably used. Although the particle size of graphite powder differs depending on the diameter of a desired rod, the maximum diameter is preferably up to several micrometers.

During mixing the organic substance and graphite powder, the powder is sufficiently dispersed with a Henschel mixer or the like. Moreover, the two substances are adequately mixed and dispersed using a kneader such as a pressing kneader or a twin-roll kneader that can apply a high shear force. The mixture is granulated with a pelletizer. The granules are extrusion molded at a high rate with an extruder such as a screw extruder or plunger extruder. The extrusion molding becomes an orientation process, and the graphite crystals are well arranged in the extrusion direction to give a molded article having a desired diameter.

During firing, the molded article is treated for about 10 hours in an air oven heated at about 180° C. while being optionally stretched to give a carbon precursor. The carbon precursor is further heated to about 1,500° C. gradually under an inert atmosphere, while the heating rate is controlled, to complete carbonization and to give a desired carbon microrod.

The chemical adsorption force of a carbon microrod is confirmed and evaluated by utilizing the fact that the amount of functional residues on the carbon surface can be semi-quantitatively determined by electrochemical measurements. Specifically, first, an electrochemical measurement apparatus is used, and an aqueous solution containing 1 M (mol·dm$^{-3}$) potassium chloride is placed in the electrolyzer. A carbon microrod which has a given length and to which a lead wire is attached is immersed therein, and a flowing blank current is measured by cyclic voltammetry (CV); the adsorption force is judged from the magnitude of the current value.

Furthermore, exposure of graphite edges in a large amount on the carbon surface after preparing the carbon microrod is thought to be an index showing that the microrod finally has many surface functional groups that are closely related to the chemical adsorption force. The charge migration characteristics of the microrod are therefore measured by utilizing the fact that a carbon surface exposing edges in a large amount tends to make electrons migrate easily and is closely related to excellent electrode characteristics. Specifically, the electrochemical characteristics of the microrod surface are judged in the following manner: an electrochemical measurement apparatus is used; ferricyanate ions and ferrocyanate ions are added to the above aqueous potassium chloride solution; the redox (oxidation-reduction) reaction of the ions is measured by CV; and the electrochemical characteristics are judged from the potential difference $\Delta E_p$ between the oxidation peak and the reduction peak on the CV curve of the redox reaction.

EXAMPLES

Example 1

A matrix carbon raw material for carbon microrods was prepared as explained below. A diallyl phthalate monomer in an amount of 25% by mass was added as a plasticizer to a composite composition of 65% by mass of a chlorinated vinyl chloride resin (trade name of T-741, manufactured by Nippon Carbide Industries Co., Ltd.) and 35% by mass of a graphite fine powder (having an average particle size of 1 $\mu$m, manufactured by Hitachi Powdered Metals Co., Ltd.), and dispersed with a Henschel mixer. The mixture was adequately and repeatedly kneaded with a twin roll for mixing with the surface temperature held at 120° C. to give a composition. The composition was pelletized with a pelletizer to give a composition for molding.

The pellets were extruded at 140° C. at a rate of 0.1 m/min with a screw extruder using a ceramic die having a diameter of 50 $\mu$m while the pellets were being degassed. The extruded material was fixed to a frame, and treated for 10 hours in an air oven heated to 180° C. to give a carbon precursor wire rod. The wire rod was heated to 500° C., in a nitrogen gas atmosphere, at a rate of 25° C./hr, then heated to 1,500° C. at a rate of 100° C./hr, held at 1,500° C. for 3 hours, and allowed to stand to cool. As a result, firing was completed.

The carbon microrod thus obtained had a diameter of 38 $\mu$m, and a flexural strength of 210 MPa. It contained about 65% by mass of graphite based on the microrod mass. In order to confirm the chemical adsorption force of the carbon microrod, its electrochemical response was measured and judged.

The chemical adsorption amount of the carbon microrod thus obtained was determined as explained below according to a given evaluation method. First, in order to determine the chemical adsorption amount of the microrod, a polarographic analyzer (trade name of P-1100, manufactured by Yanagimoto K. K.) was used as an electrochemical measuring apparatus. In a 1 M potassium chloride solution, the blank current was measured, and then the CV curve of 5 mM ferrocyanate-ferricyanate ions was measured by the three-electrode method in which a silver/silver chloride reference electrode was used. The following results were then obtained. The blank current of the carbon microrod obtained in the present example was significantly large, and the redox peak potential difference $\Delta E_P$ of the redox ions was 70 mV. The value approximates the theoretical value (60 mV) of the peak potential difference of the reversible redox ions. Accordingly, the microrod is judged to have an adsorption force sufficient to measure a myocardial cell.

A myocardial cell was chemically adsorbed to the carbon microrod, and a stress was applied to the cell; the adhesive force was calculated from the spring constant and the deflection amount of the microrod shown when the myocardial cell was released from the microrod. The adhesive force thus obtained was 2.42 $\mu$N. The value was sufficiently large in comparison with the contraction force of from 1 to 2 $\mu$N of the myocardial cell.

Example 2

A matrix carbon raw material for carbon microrods was prepared as explained below. A diallyl phthalate monomer in an amount of 20% by mass was added as a plasticizer to a composite composition of a mixture of 50% by mass of a vinyl chloride resin (trade name of Nipolit MQ, manufactured by Tisso Corporation) and 15% by mass of a furan resin (trade name of Hitafuran VF 302, manufactured by Hitachi Chemical Co, Ltd.) and 35% by mass of a graphite fine powder (having an average particle size of 1 $\mu$m, manufactured by Nippon Graphite Industry Co., Ltd.), and was dispersed with a Henschel mixer. The mixture was adequately and repeatedly kneaded with a twin roll kneader for mixing with the surface temperature held at 110° C. to give a composition. The composition was pelletized with a pelletizer to give a composition for molding.

The pellets were extruded at 130° C. at a rate of 0.1 m/min with a screw extruder using a ceramic die having a diameter of 50 $\mu$m while the pellets were being degassed. The extruded material was fixed to a frame, and treated for 10 hours in an air oven heated to 180° C. to give a carbon precursor wire rod. The wire rod was heated to 500° C. under a nitrogen gas atmosphere at a rate of 25° C./hr, then heated to 1,500° C. at a rate of 100° C./hr, held at 1,500° C. for 3 hours, and allowed to stand to cool. As a result, firing was completed.

The carbon microrod thus obtained had a diameter of 40 $\mu$m, and a flexural strength of 180 MPa. It contained about 65% by mass of graphite based on the microrod mass.

The chemical adsorption amount of the carbon microrod thus obtained was determined in the same manner as in Example 1. The following results were thus obtained. The blank current of the carbon microrod obtained in the present example was significantly large, and the redox peak potential difference $\Delta E_P$ of the redox ions was 70 mV. The value approximates the theoretical value (60 mV) of the peak potential difference of the reversible redox ions. Accordingly, the microrod is judged to have an adsorption force sufficient to measure a myocardial cell.

A myocardial cell was chemically adsorbed to the carbon microrod, and a stress was applied to the cell; the adhesive force was calculated from the spring constant and the deflection amount of the microrod shown when the myocardial cell was released from the microrod. The adhesive force thus obtained was 2.42 $\mu$N. The value was sufficiently large in comparison with the contraction force, of from 1 to 2 $\mu$N, of the myocardial cell.

FIG. 1 shows a view of an apparatus for measuring the contraction force of a myocardial cell as one embodiment of a measurement in which the carbon microrods of the invention are used. In FIG. 1, a myocardial cell 10 is chemically adsorbed to and held by two carbon microrods 12, 13. The carbon microrod 13 is deflected more than the carbon microrod 12 when the cell is contracted because the former is longer than the latter. The longer carbon microrod 13 is fixed to a piezoelectric element 14, and the tension of the myocardial cell is controlled by controlling the voltage applied to the piezoelectric element 14. The image of the carbon microrod 13 illuminated by a lamp 16 is formed on a tetra-sectioned photodiode 22 through a lens 18 and a mirror 20. The signal from each region of the tetra-sectioned photodiode 22 is amplified by a differential amplifier 24, and fed back into the piezoelectric element 14, whereby the contraction force is measured under the condition that the length of the myocardial cell is kept constant.

As explained above, the present invention provides a carbon microrod excellent in adhesive force produced by chemisorption and suitable for holding a fine object.

What is claimed is:

1. A carbon microrod having a cell adsorbed thereto said microrod, comprising a glassy carbon and a crystalline carbon.

2. The carbon microrod according to claim 1, wherein the crystalline carbon is oriented substantially in one direction.

3. The carbon microrod according to claim 1, wherein the carbon microrod contains at least in a surface portion at least 20% by mass of the crystalline carbon.

4. The carbon microrod according to claim 1 wherein the carbon microrod has a cross-sectional diameter of up to 100 $\mu$m.

5. A method of producing the carbon microrod of claim 1, said method comprising the steps of:
   mixing an organic substance that leaves glassy carbon after firing with a graphite powder;
   molding the mixture so that a molded article has a desired shape; and
   firing the molded article.

6. The method of producing a carbon microrod according to claim 5, wherein extrusion molding is conducted in the molding step so that crystals of the graphite are oriented substantially in one direction.

* * * * *